| United States Patent [19] | [11] | 4,119,614 |
|---|---|---|
| King et al. | [45] | Oct. 10, 1978 |

[54] PROCESS FOR MAKING POLYESTER POLYMER

[75] Inventors: Henry L. King, Cary; Chester C. Wu, Raleigh, both of N.C.

[73] Assignee: Monsanto Company, St. Louis, Mo.

[21] Appl. No.: 863,287

[22] Filed: Dec. 22, 1977

[51] Int. Cl.$^2$ .............................................. C08G 63/22
[52] U.S. Cl. ................................ 528/283; 252/431 N; 252/431 R; 260/429 R
[58] Field of Search ....................................... 260/75 R

[56] References Cited

U.S. PATENT DOCUMENTS

| 3,455,645 | 7/1969 | Kroes | 260/75 R X |
|---|---|---|---|
| 3,459,711 | 8/1969 | Hartmann et al. | 260/75 R |
| 3,497,474 | 2/1970 | Jeurissen et al. | 260/75 R |
| 3,497,475 | 2/1970 | Conix et al. | 260/75 R |
| 3,511,811 | 5/1970 | Conix et al. | 260/75 R |
| 3,647,362 | 3/1972 | Head et al. | 260/75 R X |
| 3,651,017 | 3/1972 | Tanabe et al. | 269/75 R |

*Primary Examiner*—Lucille M. Phynes
*Attorney, Agent, or Firm*—Robert L. Broad, Jr.

[57] ABSTRACT

The method of making a polyester polymer by polycondensing a glycol phthalate prepolymer in the presence of a germanium dioxide/tetraalkyl ammonium hydroxide catalyst.

9 Claims, No Drawings

PROCESS FOR MAKING POLYESTER POLYMER

BACKGROUND OF THE INVENTION a. Field of the Invention

This invention relates to methods for preparing polyester polymers from glycol phthalate prepolymers.

b. Description of the Prior Art

It is known to use germanium dioxide as a catalyst in a polycondensation reaction to produce polyesters. The germanium dioxide is sometimes added to the reaction mixture with a glycol, such as ethylene glycol. Unfortunately, crystalline germanium dioxide has a very low solubility in the glycol, resulting in undissolved catalyst particles which remain in the polymer. The undissolved catalyst particles tend to result in undersirable physical characteristics in fibers made from the polymer.

It is known to use other catalysts, such as antimony glycoloxide, in the preparation of polyethylene terephthalate and other polymers. One of the disadvantages of these catalysts is that, unless excessive amounts are used, much longer reaction times are required.

In the process of the present invention catalyst particles do not present a problem and reaction time is substantially reduced.

SUMMARY OF THE INVENTION

A process for forming polyester polymers wherein a glycol phthalate prepolymer is polycondensed in the presence of a germanium dioxide/tetraalkyl ammonium hydroxide catalyst. Tetramethyl ammonium hydroxide and tetraethyl ammonium hydroxide are the preferred ammonium hydroxides. Shorter reaction times and improved physical properties of the polymers are achieved.

DETAILED DESCRIPTION OF THE INVENTION

The process of the present invention utilizes a prepolymer which is formed by reacting a glycol with a dibasic acid such as terephthalic acid in a known manner. Preferably, the prepolymer is a glycol phthalate. The prepolymer is subjected, in the process of the present invention, to a polycondensation reaction in the presence of a germanium dioxide/tetraalkyl ammonium hydroxide catalyst to form a high polymer. Conventional pressures and temperatures are used. These are well known.

In making the prepolymer, other glycols, such as propane diol, butane diol, pentane diol or hexane diol may be used instead of the ethylene glycol, though ethylene glycol is preferred. Other dibasic acids may be used with the glycol to form the glycol phthalate prepolymer. Isophthalic and terephthalic acids are the preferred acids, with terephthalic acid being the most preferred.

The polycondensation reaction is carried out, at conventional pressures and temperatures, in the presence of an effective amount of the reaction product of germanium dioxide and a tetraalkyl ammonium hydroxide (TAAH). Either tetramethyl ammonium hydroxide (TMAH) or tetraethyl ammonium hydroxide (TEAH) may be used. The germanium dixoide and TAAH may be reacted to form the catalyst in the presence of water or in a glycol suitable for preparing fiber-forming polyesters. The germanium dioxide and TAAH react on a molar ratio of 1:1, one mole of TAAH being required to cause one mole of germanium dioxide to go into solution.

Water added with the TAAH is, optionally, removed by distillation. The resulting solution is a clear, colorless solution of the reaction product of germanium dioxide and TAAH in glycol or water which is used as a catalyst in the polycondensation reaction of this invention. The catalyst and the method for making it are disclosed and claimed in copending application Ser. No. 863,284, filed Dec. 22, 1977, in the names of Henry L. King and Chester C. Wu for "Catalyst for Polyesters and Method for Making the Same."

The glycol catalyst solution may contain 1 to 25 weight percent germanium dioxide. The preferred amount is 5–15 weight percent. Greater amounts of $GeO_2$TAAH in the glycol will of course require less of the catalyst solution to carry out the polycondensation reaction. When the catalyst solution is added to the glycol phthalate reaction mixture, the amount of germanium dioxide should be 0.008 to 0.04 weight percent, based on the weight of the glycol phthalate.

The glycol phthalate prepolymer which is used in the present process may be prepared in a known manner. For example, ethylene glycol and terephthalic acid in a molar ratio of 2:1 may be reacted at about 270° C. and 20 pounds pressure in a continuous polyester esterifier. Water of reaction and some ethylene glycol are removed by distillation and the low molecular weight prepolymer collected continuously through a valve at the bottom of the reactor. With an average residence time in the reaction of 135 minutes, the low molecular weight prepolymer will have an intrinsic viscosity of about 0.08 and a carboxyl concentration of about 660 microequivalents per gram, both measured in a conventional manner. This and other processes for making the prepolymer are known.

EXAMPLE I

This example discloses a method for making the catalyst used in the process of this invention. Ten and one-half grams (0.1 mole) of germanium dioxide and 37 grams (0.1 mole) of 40% aqueous tetraethyl ammonium hydroxide were stirred with 60 ml. of ethylene glycol until solution was complete. The solution was heated to distill off water and additional ethylene glycol was added to bring the volume to 105 1 ml. The clear, colorless solution contained 0.10 germanium dioxide equivalents per ml. of solution.

EXAMPLE II

This example discloses a method for making a glycol phthalate prepolymer which can be polycondensed by the method of this invention to form a fiber-forming polyester. A slurry consisting of ethylene glycol and terephthalic acid in the molar ratio of 2/1 was reacted at 270° C. and 20 pounds pressure in a continuous polyester esterifier. Water of reaction and some ethylene glycol were removed by distillation and the low molecular weight prepolymer product was collected continuously through a valve at the bottom of the reactor. The rate of removal of prepolymer was such as to maintain a constant level in the reactor. The average residence time in the reactor was 135 minutes. The low molecular weight glycol phthalate prepolymer collected had an intrinsic viscosity of 0.08 and a carboxyl concentration of 659$\mu$eq/g., both measured in a conventional manner.

EXAMPLE III

Two hundred and ten grams of the prepolymer of Example II were added to a 1-liter capacity, stirred, batch autoclave. To the autoclave was added 0.43 ml (150 ppm germanium, based on polymer weight) of the catalyst of Example I, the autoclave purged with nitrogen and heated to 280° C. Pressure in the system was reduced by applying a vacuum and polymerization to high molecular weight PET continued at pressures of less than 2 mm Hg until the desired molecular weight was obtained. A polymer with an intrinsic viscosity of 0.61 was obtained in a period of 62 minutes from the beginning of pressure reduction. The polymer melted at 256° C. and contained 1.32 mole percent diethylene glycol. Drawn fibers formed from the polymer had a purity value of 1.6 and a brightness value of 88 as measured by tristimulus values obtained with a G.E. recording spectrophotomer.

EXAMPLE IV (COMPARATIVE)

Example III was repeated except that the catalyst used was 0.05 grams (150 ppm antimony, based on polymer weight) of antimony glycoloxide. Polymer with properties equivalent to Example III were obtained, however, the time required for polymerization to an intrinsic viscosity of 0.61 was 102 minutes.

EXAMPLE V (COMPARATIVE)

Example IV was repeated except that the catalyst used was 0.10 grams (300 ppm antimony) of antimony glycoloxide, twice as much as in Example IV. The time required for polymerization to an intrinsic viscosity of 0.61 was 67 minutes. Polymerization time was reduced but twice as much catalyst was required.

EXAMPLE VI (COMPARATIVE)

One hundred and sixty-six grams (1 mole) of terephthalic acid, 87 grams (1.4 moles) of ethylene glycol and 0.05 grams (150 ppm antimonyl based on polymer weight) of antimony glycoloxide were added to a 1-liter capacity, stirred, batch autoclave and the autoclave purged with nitrogen. The autoclave, with the exit valve closed, was heated to 240° C. The exit valve was opened slowly and water of reaction and a small amount of ethylene glycol were removed continuously over a period of two hours with the temperature maintained in a range of 240°–250° C.

The autoclave was next heated to 280° C. and polymerization to a high molecular weight PET was carried out as in previous examples. The time required to obtain a polymer with an intrinsic viscosity of 0.62 was 95 minutes. The polymer contained 2.75 mole percent diethylene glycol and melted at 254° C. Fibers formed from the polymer had a purity of 1.7 and a brightness of 88.

EXAMPLE VII

Example VI was repeated except that the catalyst used was 0.43 ml of the catalyst solution prepared in Example I. A polymer with an intrinsic viscosity of 0.64 was obtained in a period of 46 minutes after beginning pressure reduction, less than half the time required in Example VI. The polymer had properties equivalent to Example VI except that the diethylene glycol content was reduced to 1.65 mole percent. This example demonstrates the increased rates possible with the catalyst of this invention in batch PET preparation. This Example also shows the reduction in undesirable side reactions which result in diethylene glycol formation when some catalysts are used.

EXAMPLE VIII

A catalyst solution was made as described in Example I with tetramethyl ammonium hydroxide being substituted for tetraethyl ammonium hydroxide. Example VII was repeated, using this catalyst instead of the $GeO_2$/TEAH catalyst of Example VII. Polymer having an intrinsic viscosity of 0.61 was obtained in a polymerization time of 56 minutes. Fibers from the polymer were comparable to fibers from the polymer of Example VII.

What is claimed is:

1. A process for preparation of polyester polymers, comprising polycondensing a glycol phthalate prepolymer in the presence of an effective amount of the reaction product of germanium dioxide and a tetraalkyl ammonium hydroxide.

2. The process of claim 1 wherein the tetraalkyl ammonium hydroxide is selected from the group consisting of tetramethyl ammonium hydroxide and tetraethyl ammonium hydroxide.

3. The process of claim 2 wherein the glycol phthalate is selected from the group consisting of ethylene isophthalate and ethylene terephthalate.

4. The process of claim 3 wherein the glycol phthalate is polycondensed in the presence of ethylene glycol containing an amount of reaction product such that the glycol contains an equivalent of 1 to 25 weight percent germanium dioxide.

5. The process of claim 4 wherein the glycol contains an equivalent of 5–15 weight percent germanium dioxide.

6. The process of claim 3 wherein the amount of said catalyst is such that there is present 0.008 to 0.04 weight percent germanium dioxide, based on the weight of the glycol phthalate.

7. The process of claim 6 wherein the glycol phthalate is ethylene terephthalate.

8. The process of claim 7 wherein the tetraaklyl ammonium hydroxide is tetramethyl ammonium hydroxide.

9. The process of claim 7 wherein the tetraalkyl ammonium hydroxide is tetraethyl ammonium hydroxide.

* * * * *